Feb. 17, 1942.  J. B. BURKS  2,273,693
VALVE ASSEMBLY
Filed Jan. 6, 1940
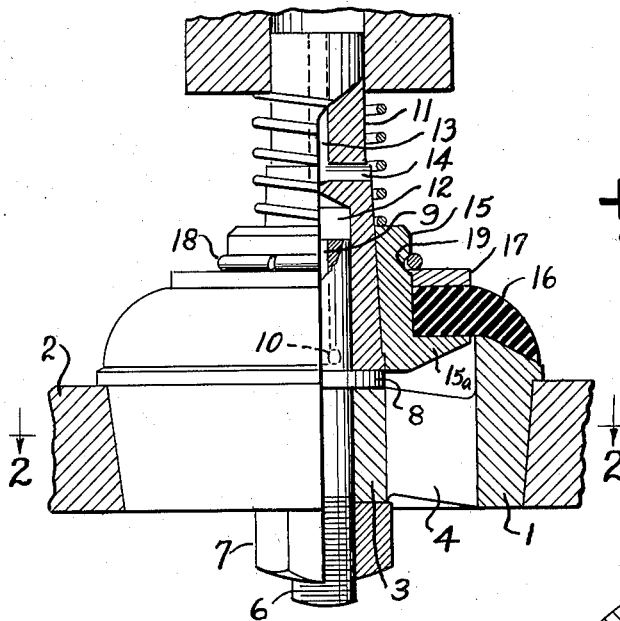
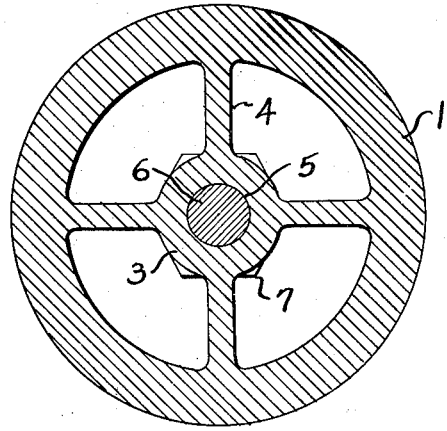
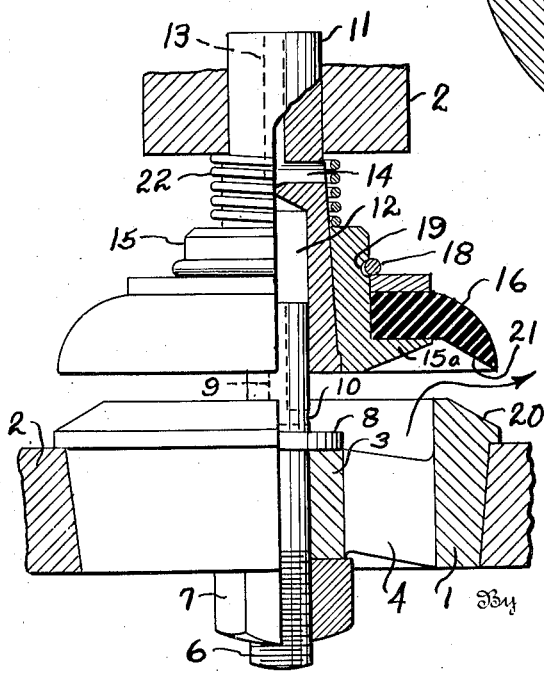
Inventor
JAMES B. BURKS
By E. V. Hardway
Attorney Patented Feb. 17, 1942

2,273,693

UNITED STATES PATENT OFFICE 2,273,693

VALVE ASSEMBLY

James B. Burks, Houston, Tex., assignor of one-third to Monroe B. Taylor, Harris County, Tex.

Application January 6, 1940, Serial No. 312,690

2 Claims. (Cl. 251—144)

This invention relates to a valve assembly and has particular relation to an assembly of the character described specially adapted for use on slush pumps which are designed to pump gritty fluid under high pressure.

An object of the invention is to provide a novel type of valve seat having an annular seating face which is pitched downwardly and outwardly with relation to the fluid passageway through the seat.

Another object of the invention is to provide in a valve assembly an annular valve seat provided with a spider having a central hub and radiating arms connecting the hub to the seat, said hub having an impact face to receive the impact of the valve and the arms of the spider being pitched in a direction such that the impact of the valve will tend to expand the seat to thereby prevent the seat from becoming loose in the pump structure wherein it is seated.

Another object of the invention is to provide a valve seat of the character above specified wherein the spider arms are so pitched as to cause the seat to contract when a seat puller is engaged with the hub of the spider in the process of pulling the seat from the pump structure.

The invention also embodies a novel type of valve which is so pitched as to offer a minimum of resistance against the liquid upon opening movement of the valve and to form a baffle whereby the closing movement of the valve is retarded to minimize the severity of the valve stroke against the seat upon final closing movement of the valve.

A further object of the invention is to provide a valve assembly of the character described having a novel type of valve stem detachable from the valve proper and forming also a bushing for guiding the valve in its movements relative to the seat.

It is a further object of the invention to provide a valve assembly having a novel arrangement of by-passes through the stem and through the bushing guide to minimize the abrasive effect of the gritty fluid in which the valve operates.

With the above and other objects in view the invention has particular relation to certain novel features of construction, operation and arrangement of parts, an example of which is given in this specification and illustrated in the accompanying drawing, wherein:

Figure 1 shows a side elevation of the assembly, partly in section, showing the valve closed.

Figure 2 shows a cross-sectional view of the valve seat taken on the line 2—2 of Figure 1, and Figure 3 shows a side elevation of the assembly, partly in section, showing the valve open.

Referring now more particularly to the drawing wherein like numerals of reference designate similar parts in each of the figures, the numeral 1 designates an annular valve seat which is seated in a fixed part 2 of the pump. The seat is driven tightly into the pump part wherein it is seated. It has a spider comprising a central hub 3 and the radial arms 4. The arms diverge downwardly relative to the central hub for a purpose to be hereinafter stated.

The hub 3 has an axial bearing 5 to receive the lower end of the guide rod 6 which is fitted therethrough and whose lower end is threaded to receive the clamp nut 7 which is screwed thereon and which clamps against the lower end of the hub 3. The guide rod has an annular rib 8 which clamps against the upper end of the hub 3 and said rod is extended above said rib and is provided with an axial channel 9 leading downwardly from its upper end and terminating in a lateral port 10 above the rib 8.

There is a valve stem 11 whose lower end is slightly flared externally and is provided with an axial socket 12 to receive the upper end of the guide rod 6. The stem 11 has a channel 13 leading downwardly therethrough from its upper end and terminating in a lateral port 14.

The lower end of the stem 11 forms a bushing over which the valve body 15 is driven. The lower end of the valve body has an external, annular flange 15a on which the annular valve disc 16 is seated, said disc surrounding the valve body. An annular clamp flange 17 surrounds the valve body and is seated against the valve disc and is locked in place by means of a lock ring 18 which is seated in an external, annular groove 19 in the body, and which is open on one side. The valve body and disc move as a unit with the stem 11 and upon their reciprocation the gritty liquid readily flows back and forth through the channels 9 and 13 to prevent the formation of vacuums and does not quickly cut out the guide rod and stem.

The seat 1 has a downwardly and outwardly tapering, annular face 20 and the confronting side of the disc 16 has a correspondingly tapered face 21 on its underside adapted to cooperate with the face 20. The valve disc 16 is formed of rubber or other suitable yieldable material and its upper side is convex, or dome-shaped as shown.

Upon discharge stroke of the pump plunger the valve will be lifted to the position shown in Figure 3. On account of the convex shape of its upper side the resistance of the liquid above will greatly decrease. Upon suction stroke of the pump plunger the valve will be closed but the underside of the disc 16 being substantially concaved it will be retarded, in its closing movement, by the liquid so as to minimize the hammering action against the seat. When the valve reaches closed position the face 21 will seat on the face 20 and the lower end of the stem 11 will strike the upper face of the rib 8 thus causing a slight downward movement of the hub. On account of the downward and outward inclination of the arms 4 this downward movement of the hub 3 will correspondingly expand the seat 1 causing it to become more securely seated in the part 2 of the pump so that the hammering action of the valve against the seat will not tend to loosen it.

The valve is assisted in its closing movement by means of a coil spring 22 which surrounds the stem 11 and is interposed between the body 15 and the part 2 of the pump.

As hereinabove stated the seat 20 is downwardly and outwardly tapered. The pumped liquid will follow the course indicated by the arrow in Figure 3 and the gritty substances in the liquid will therefore not come into contact with the face 20 but said face will be shielded from the cutting action of the sand and grit in the liquid.

When it becomes necessary to renew the seat 1 the valve may be first removed and then the guide rod 6 detached. A seat puller may then be engaged with the hub 3 in the usual manner and an upward pull exerted. Thereupon the arms 4, on account of their upward and inward inclination will slightly contract the seat 1 thus releasing it and making it more easily unseated.

The drawing and description are illustrative merely, while the broad principle of the invention will be defined by the appended claims.

What I claim is:

1. A valve assembly comprising a valve seat having an outside tapering face, a spider in the seat, a guide rod anchored to the spider, a valve stem having an axial socket to receive the upper end of the guide rod, a valve body on the stem, a valve disc formed of resilient material on the body and removable therefrom whose underside has a tapering face adapted to cooperate with the seat face, the guide rod and the stem each having a channel leading downwardly from the upper ends thereof and terminating in lateral ports.

2. A valve assembly comprising an annular valve seat having an outside tapering face and having a spider, a guide rod anchored to the spider and having an annular rib resting on said spider, a valve stem whose lower end is formed with a socket to receive the upper end of the guide rod, said rib forming a stop to limit the downward movement of the stem, the exterior of the lower end of the stem being flared, an annular flange wedged on the flared portion of the stem, a valve disc formed of resilient material seated on the flange and extended beyond the flange, a clamp ring retaining the valve disc on said flange and detachably secured to the flange, the underside of the extended portion of the resilient valve disc having a downwardly and outwardly tapering face conforming in shape to, and adapted to seat on the seat face and whose upper side is convex.

JAMES B. BURKS.